United States Patent [19]

Kohn

[11] Patent Number: 4,929,405

[45] Date of Patent: May 29, 1990

[54] ULTRATHIN POLYIMIDE POLYMER FLIMS AND THEIR PREPARATION

[75] Inventor: Rachel S. Kohn, Springfield, N.J.

[73] Assignee: Hoechst Celanese Corp., Somerville, N.J.

[21] Appl. No.: 355,711

[22] Filed: May 22, 1989

Related U.S. Application Data

[60] Continuation-in-part of Ser. No. 339,903, Apr. 17, 1989, Pat. No. 4,880,699, which is a continuation of Ser. No. 267,712, Nov. 4, 1988, abandoned, which is a continuation of Ser. No. 149,824, Jan. 29, 1988, abandoned, which is a division of Ser. No. 917,731, Oct. 10, 1986, Pat. No. 4,746,474.

[51] Int. Cl.$^5$ .............................................. B29C 41/12
[52] U.S. Cl. ................................... 264/41; 55/16; 210/500.39; 264/298; 264/331.19; 428/220; 524/465; 524/466
[58] Field of Search ............... 524/465, 466; 428/220; 264/41, 298, 331.9

[56] References Cited

U.S. PATENT DOCUMENTS

| | | | |
|---|---|---|---|
| 2,710,853 | 6/1955 | Edwards | 528/289 |
| 3,673,145 | 6/1972 | Minami et al. | 528/182 |
| 3,767,737 | 10/1973 | Lundstrom | 264/216 |
| 3,892,665 | 7/1975 | Steigelmann et al. | 264/41 |
| 4,132,924 | 1/1979 | Kimura . | |
| 4,155,793 | 5/1979 | Selemme et al. | 264/298 |
| 4,279,855 | 7/1981 | Ward III | 264/216 |
| 4,374,891 | 2/1983 | Ward III | 428/447 |
| 4,393,113 | 7/1983 | Sugie et al. | 428/447 |
| 4,746,474 | 5/1988 | Kohn | 524/465 |

*Primary Examiner*—Morton Foelak
*Attorney, Agent, or Firm*—Lynch, Cox, Guman & Mahan

[57] ABSTRACT

Disclosed herein are free-standing, pinhole-free, ultrathin polyimide films having thicknesses of about 400 angstroms or less and a process to prepare them. The films find particular utility in separatory applications.

29 Claims, No Drawings

ULTRATHIN POLYIMIDE POLYMER FILMS AND THEIR PREPARATION

STATEMENT AS TO RIGHTS TO INVENTIONS MADE UNDER FEDERALLY SPONSORED RESEARCH AND DEVELOPMENT

This invention was made with Government support under Contract No. DAAK 20-84-C-0147 awarded by the Department of Defense (DOD). The Government has certain rights in this invention.

CROSS REFERENCE TO RELATED APPLICATIONS

This is a continuation-in-part of co-pending application Ser. No. 07/339,903 filed on Apr. 17, 1989, now U.S. Pat. No. 4,880,699 which is a continuation of application Ser. No. 07/267,712 filed on Nov. 4, 1988, now abandoned, which is a continuation of application Ser. No. 07/149,824 which was filed on Jan. 29, 1988, now abandoned, which is a divisional of application Ser. No. 06/917,731 filed on Oct. 10, 1986, now issued as U.S. Pat. No. 4,746,474 on May 24, 1988.

BACKGROUND OF INVENTION

1. Field of Invention

This invention relates to polymer films. More particularly, this invention relates to ultrathin, polyimide polymer films and their production.

2. Prior Art

In U.S. Pat. No. 3,673,145, a process for preparing polyimide solutions that can be cast as films is disclosed. However, the disclosed films have thicknesses between 15 microns (i.e. 150,000 angstroms) and 80 microns (i.e. 800,000 angstroms) and cannot, therefore, be classified as ultrathin polyimide films.

In U.S. Pat. No. 2,867,609 void-free films allegedly prepared from polypyromellitimides are disclosed. However, no film thicknesses are disclosed.

In U.S. Pat. No. 2,710,853, polypyromellitimide films having thicknesses of three to seven mils are disclosed. However, the films are not ultrathin.

In U.S. Pat. No. 3,179,614, polyamide-acid films having thicknesses of 0.1 to 1.0 mils are converted to polyimide films by either heating the films or by treating them with acetic anhydride and pyridine. Such films, however, are not ultrathin.

Similarly, in U.S. Pat. Nos. 3,179,633 and 3,179,634, polyamide-acid films having thicknesses between 0.1 and 7 mils are thermally or chemically converted to polyimide films.

In U.S. Pat. No. 2,760,233, a process is disclosed for preparing curved polymer sheets from polyimide polymers. However, polyimide films are not disclosed nor are specific solvent mixtures and ratios suitable for casting ultrathin, pinhole-free, polyimide films disclosed.

U.S. Pat. No. 3,551,244 discloses a process for preparing on a water surface films having thicknesses between 0.05 and 5.0 microns (i.e. between 500 and 50,000 angstroms). The patent discloses that certain halogenated solvents, such as chlorobenzene, are suitable casting solvents and states that polyamide films can be prepared. However, polyimide polymers are not disclosed as being suitable and no specific solvent mixtures and ratios suitable for casting pinhole-free polyimide films having thicknesses less than 400 angstroms are disclosed.

In U.S. Pat. No. 3,933,561, a process for preparing polymeric films on water is disclosed. The film thicknesses are usually less than about 2.5 microns (i.e. 25,000 angstroms) and thicknesses of less than 0.1 micron (i.e. 1000 angstroms) are allegedly achieved. While polyamides are allegedly suitable for the patent's process, polyimide films are not disclosed nor are specific solvent mixtures and ratios suitable for casting ultrathin polyimide films.

U.S. Pat. No. 3,767,737 discloses a method for producing nonporous polymer membranes having thicknesses between 0.005 and 0.05 mils on a support liquid. Any polymer capable of being cast as a film from solvents is asserted to be suitable for use in the patent's process. However, polyimides are not specifically listed as suitable polymers and specific mixtures of solvents and appropriate solvent ratios for preparing pinhole-free polyimide films having thicknesses of 400 angstroms or less are not disclosed.

U.S. Pat. Nos. 4,155,793, 4,279,855 and 4,374,891 disclose processes for preparing substantially void-free, ultrathin, permeable, polymeric membranes having a thickness of 500 angstroms or less. Organic and inorganic polymers are allegedly suitable for use in the patent's process. However, only films prepared from organopolysiloxane-polycarbonate interpolymers mixed with polyphenylene oxide are disclosed in the examples. Polyimide films are not disclosed nor are suitable solvent mixtures and ratios for casting polyimide films having thicknesses of 400 angstroms or less.

Other patents, such as U.S. Pat. Nos. 2,631,334, 2,689,187, and 4,393,113, also disclose ultrathin, polymeric films. However, polyimide films are not disclosed.

U.S. Pat. Nos. 3,356,648 and 3,959,350 disclose fluorinated polyimide films. However, no film thicknesses are disclosed, and a process for preparing ultrathin, pinhole-free, polyimide films is not disclosed.

U.S. Pat. No. 4,592,925 discloses fluorinated polyimide films having thicknesses of about 0.1 mil to about 0.5 mil (i.e., about 25,400 to about 127,000 angstroms). U.S. Pat. No. 4,645,824 discloses fluorinated polyimide films having thicknesses of about 0.1 mil to about 2.0 mils (i.e., about 25,400 to about 508,000 angstroms). Thus, these patents do not disclose ultrathin polyimide films.

Commonly-assigned U.S. patent application Ser. No. 07/217,928 discloses films having a thickness in the range of about 2 to about 3 mils prepared from copolyimides derived from 2,2-bis(aminophenyl) hexafluoropropane. Commonly-assigned U.S patent application Ser. No. 07/217,929 discloses that films having thicknesses of several mils can be prepared by high molecular weight polyimides containing hexafluoropropylidene linkages. Neither patent however, discloses the preparation of ultrathin films nor a means for preparing such films.

In the prior art, the preparation of ultrathin, pinhole-free, polyimide, free-standing films having thicknesses of less than 400 angstroms generally has not been disclosed. Usually, prior art polymer films having thicknesses of less than 400 angstroms contain voids and other macroscopic defects.

Therefore, it is an object of this invention to prepare ultrathin, polyimide polymer films.

It is a further object of this invention to prepare pinhole-free, polyimide polymeric films.

It is also an object of this invention to prepare free-standing, polyimide films having thicknesses of 400 angstroms or less.

These and other objects are obtained by the products and process of the present invention.

SUMMARY OF INVENTION

The instant invention provides a process for preparing macroscopically pinhole-free, ultrathin, free-standing polyimide films having thicknesses of about 400 angstroms or less. The films are prepared by dissolving a polyimide polymer in a suitable solvent or mixture of solvents, such as a mixture of 1,2,3-trichloropropane and ortho-dichlorobenzene, to form a polymeric solution, casting the solution on water to form a free-standing film, and removing the film from the water. The ultrathin films of the present invention can be used in separatory applications and as drug release membranes for the controlled release of drugs.

DETAILED DESCRIPTION OF INVENTION

The preparation of polyimides is well known in the prior art. Polyimides are generally prepared in a two-step process in which a dianhydride and a diamine are first reacted to prepare a polyamic acid which is subsequently converted to a polyimide in a second step.

A wide variety of dianhydrides and diamines can be reacted to prepare polyimides that are suitable for use in the present invention. Dianhydrides and diamines that can be reacted to yield suitable polyimides as well as processes for preparing such polyimides are disclosed in "Polyimides," by C. E. Sroog, *J. Polymer Science*: Macromolecular Reviews, volume 11, 161–208 (1976), and U.S. Pat. Nos. 2,710,853, 3,179,631, 3,179,634, 3,356,648, 3,959,350, 4,592,925 and 4,645,824 which are incorporated herein by reference. The preferred dianhydrides are 3,3', 4,4'-benzophenone tetracarboxylic dianhydride, 2,2-bis(3,4-dicarboxyphenyl)hexafluoropropane dianhydride and pyromellitic dianhydride. The preferred diamines are bis-(4-aminophenyl) ether, 5(6)-amino-1-(4'-aminophenyl)-1,3,3-tri-methylindane (referred to as DAPI), 2,2-bis(3-aminophenyl) hexafluoropropane (referred to as 3,3'-6F diamine), 2,2-bis (4-aminophenyl)hexafluoropropane (referred to as 4,4'-6F diamine), 2-(3-aminophenyl)-2-(4-aminophenyl) hexafluoropropane, 2,2-bis(3-aminophenyl)-1,1,1-trifluoro-2-phenyl-ethane, 2,2-bis(4-aminophenyl)-1,1,1-trifluoro-2-phenyl-ethane and 2-(3-aminophenyl)-2-(4-aminophenyl)-1,1,1-trifluoro-2-phenyl-ethane.

A variety of solvents can be used for the reaction of the dianhydride with the diamine. Suitable solvents are disclosed in U.S. Pat. No. 3,179,634. Preferably, the solvent is dimethyl formamide, dimethyl sulfoxide, N-methyl pyrrolidone or dimethylacetamide, and most preferably is dimethylacetamide.

After a polyamic acid is prepared by the reaction of a diamine and a dianhydride, the polyamic acid is converted to a polyimide using thermal or chemical conversion processes. Preferably, the polyamic acid is chemically converted employing acetic anhydride in the presence of pyridine. If a fluorinated polyamic acid is involved, it is preferred to employ acetic acid in the presence of beta picoline. The resulting polyimide can be precipitated by water and then filtered and dried.

Some of the preferred polyimides have repeating units of the formula:

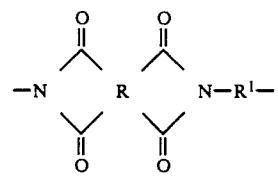

wherein R is a tetravalent organic radical and R' is a divalent organic radical selected from the group consisting of aromatic, aliphatic, cycloaliphatic, heterocyclic, combinations of aromatic and aliphatic, and substituted groups thereof (e.g. with halogen and methyl substituents and/or other substituents known to those skilled in the art). In one preferred embodiment, R or R' or both contain fluorine substituents. Preferably R is a tetravalent aromatic radical containing at least one ring of six carbon atoms, said ring being characterized by benzenoid unsaturation and the four carbonyl groups being attached directly to separate carbon atoms in a ring of the R radical and each pair of carbonyl groups being attached to adjacent carbon atoms in a ring of the R radical, and preferably R' is a divalent benzenoid radical, or substituted groups thereof, selected from the group consisting of:

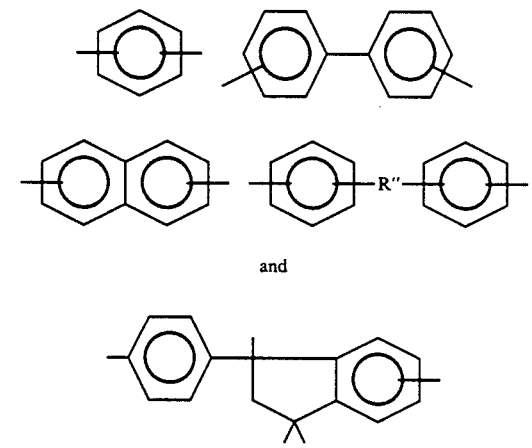

and wherein R'' is selected from the group consisting of a substituted or unsubstituted alkyl or alkylene chain having one to three carbon atoms,

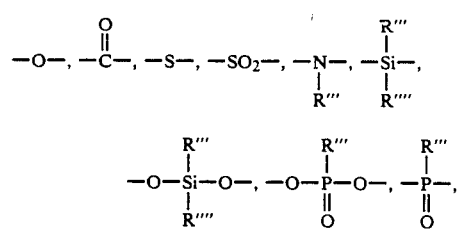

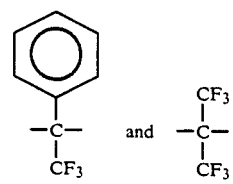

wherein R''' and R'''' are selected from the group consisting of substituted or unsubstituted alkyl and aryl.

R may also preferably be a tetravalent aromatic radical, or substituted groups thereof, selected from the group consisting of

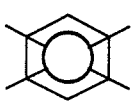
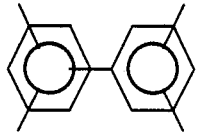

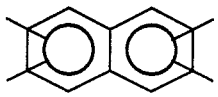 and

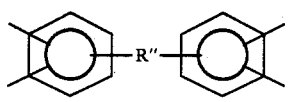

wherein R'' is defined as above.

Most preferably, R'' above is selected from the group consisting of

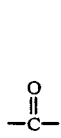, 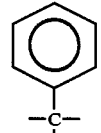 and 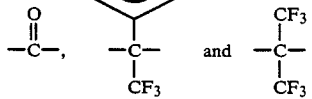

In a most preferred polyimide polymer, R is

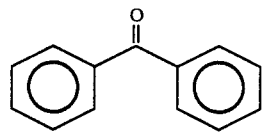

and R' is

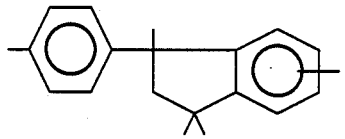

and it can be represented by the general formula:

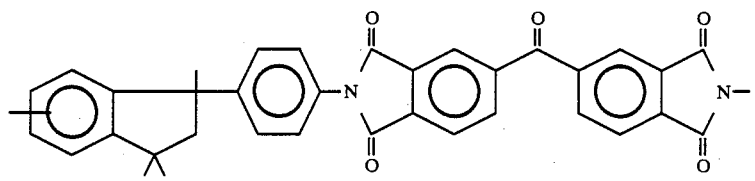

It is prepared by the reaction of DAPI with 3, 3', 4, 4'-benzophenone tetracarboxylic dianhydride to produce a polyamic acid. The polyamic acid can be chemically imidized using acetic anhydride and pyridine according to the teachings of U.S. Pat. No. 3,179,634. The preferred polyimide polymer is sold under the trade-name Araldite XU 218 and is available from the Ciba-Geigy Corporation.

In another most preferred polyimide, R is

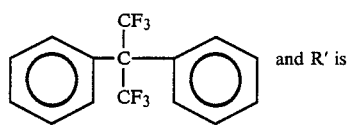 and R' is

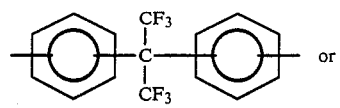 or

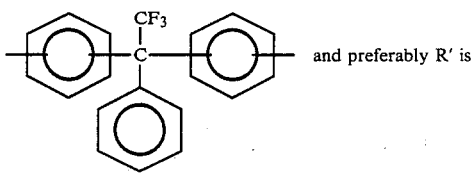 and preferably R' is

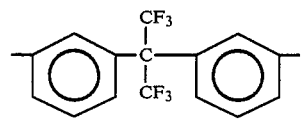

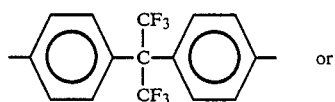 or

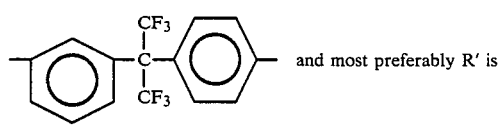 and most preferably R' is

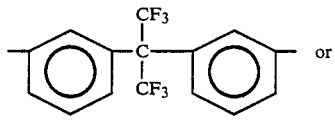 or

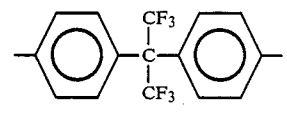

The polyimide wherein R' is

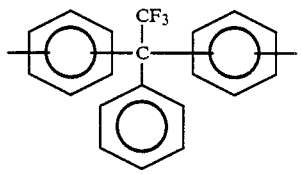

can be represented by the general formula

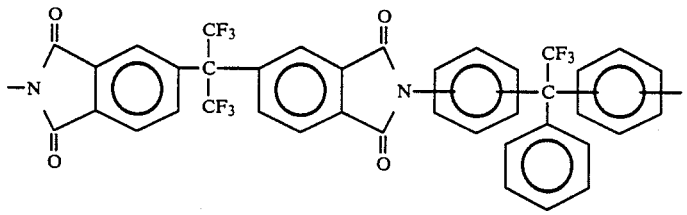

and may be prepared by reacting 2,2-bis(3,4-dicarboxyphenyl) hexafluoropropane dianhydride and a diamine selected from the group consisting of 2,2-bis(3-aminophenyl)-1,1,1-trifluoro-2-phenyl-ethane, 2,2-bis(4-aminophenyl)-1,1,1-trifluoro-2-phenyl-ethane, and 2-(3-aminophenyl)-2-(4-aminophenyl)-1,1,1-trifluoro-2-phenyl-ethane in accordance with the teachings in U.S. Pat. Nos. 3,356,648 and 4,645,824.

The preferred fluorinated polyimide above wherein R' is

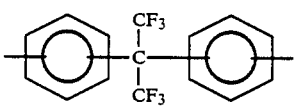

can be represented by the general formula

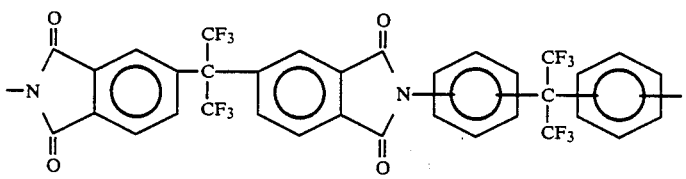

and may be prepared by reacting 2,2-bis(3,4-dicarboxyphenyl) hexafluoropropane dianhydride (referred to as 6F-DA) and a diamine selected from the group consisting of 2,2-bis (3-aminophenyl) hexafluoropropane, 2,2-bis(4-aminophenyl) hexafluoropropane and 2-(3-aminophenyl)-2-(4-aminophenyl) hexafluoropropane. Preferably, equimolar amounts are reacted and a low-temperature, substantially isothermal polymerization process followed by cyclization is employed. Most preferably, substantially analytically pure reactants are utilized. The preparation of this preferred polyimide is described in U.S. Pat. Nos. 3,356,648 and 4,645,824 and in commonly assigned U.S. patent application Ser. No. 07/217,929, which are incorporated herein by reference. The 2,2-bis(3,4-dicarboxyphenyl) hexafluoropropane dianhydride (6F-DA) is available from Hoechst-Celanese Corporation in Somerville, N.J.

It is also possible to prepare the films of the present invention from fluorinated polyimides prepared by reacting 2,2-bis(3-aminophenyl) hexafluoropropane or 2,2-bis (4-aminophenyl) hexafluoropropane with pyromellitic dianhydride and one or more additional aromatic dianhydrides, preferably a dianhydride having a diaryl nucleus. Preferred aromatic dianhydrides include bis(3,4-dicarboxyphenyl) ether dianhydride (ODPA), 3,3', 4,4'-benzophenone tetracarboxylic dianhydride (BTDA), 3,3', 4,4'-diphenyl tetracarboxylic acid dianhydride (BPDA) and 2,2-bis(3,4-dicarboxyphenyl) hexafluoropropane dianhydride (6F-DA), with 6F-DA being the most preferred dianhydride. Such polyimides are soluble in common organic solvents such as methyl ethyl ketone or N-methyl pyrrolidone. The preparation of suitable mixed dianhydride fluorinated polyimides is disclosed in U.S. patent application Ser. No. 07/217,928, which is incorporated herein by reference. Suitable conditions for reacting the diamine and the dianhydrides are disclosed in U.S. Pat. Nos. 3,356,648 and 3,959,350, which were previously incorporated by reference.

In a preferred process for preparing such fluorinated polyimides, the diamine and the mixed d]anhydrides are reacted in a suitable solvent such as N-methyl pyrrolidone, gamma-butyrolactone (BLO), or a mixture of BLO and another solvent such as diglyme. The resulting product is a polyamide-acid which is then converted to the desired polyimide by one of several methods: by heating the polyamide-acid solution until imidization is substantially complete, or by combining the polyamide-acid solution and a dehydrating agent, with or without a catalyst, and optionally heating the resulting mixture until imidization is substantially complete.

The mixed dianhydrides and the diamine are reacted in approximately equimolar proportions. The relative proportion of the dianhydrides with respect to one another ranges from about 35 to about 75 mole percent pyromellitic dianhydride and correspondingly from about 25 to about 65 mole percent of the co-dianhydride (e.g. ODPA, BTDA, BPDA or 6F-DA). The preferred ratio of the dianhydrides is about 50 mole percent of each of the co-dianhydrides.

The 3,3'-6F diamine and 4,4'-6F diamine reactants may also be used in admixture with other non-6F-aromatic diamines in preparing suitable copolyimides. The limit of addition of the additional non-6F-diamine is determined by solubility factors in that the resulting copolyimide must contain sufficient fluoro substituent groups to remain soluble in the organic solvent. Suitable diamines are materials responding to the general formula $H_2N-R-NH_2$ wherein R is a divalent organic radical. Preferably R comprises an aromatic moiety. Most preferably, R has a diaryl nucleus, e.g. a phenylene or naphthalene group.

Generally, the preferred polyimide polymers have molecular weights, $M_w$, greater than about 25,000. In addition, the most preferred fluorinated polyimide polymers have molecular weights, $M_w$, of at least about 75,000.

Although 1,2,3-trichloropropane alone can be employed to cast ultrathin polyimide films, it is preferred to employ a mixture of 1,2,3-trichloropropane and ortho-dichlorobenzene. The presence of ortho-dichlorobenzene in the solution used for casting the film tends to make the film more uniform in thickness. Suitable solvent ratios are about a 1:1 to about a 10:1 by volume ratio of 1,2,3-trichloropropane: ortho-dichlorobenzene and preferably about a 20:7 ratio. The solvent ratios described above should not be altered substantially because if too much ortho-dichlorobenzene is employed, the film may be too thin and fragile to lift from the casting surface.

When fluorinated polyimides are employed, propyl acetate or butyl acetate may also be utilized as the casting solvent to prepare ultrathin, pinhole-free films. However 1,2,3-trichloropropane and butyl acetate are preferred, with 1,2,3-trichloropropane (and mixtures of 1,2,3-trichloropropane and ortho-dichlorobenzene) being most preferred.

The polyimide polymer is first dissolved in a suitable solvent or solvent mixture to prepare a casting solution by stirring the polymers and solvents at a temperature less than 100° C. (e.g. 60° C.) for several hours (e.g. three to seven hours). The casting solution will contain about two to about twelve percent by weight of the polymer, preferably about four to about ten percent and most preferably about six to about eight percent based upon the total weight of the casting solution. Generally, the greater the amount of polymer in the casting solution, the thicker the films will be that are prepared. Conversely, the lower the amount of polymer, the thinner the films will be. However, if the percent by weight is too low, such as below one percent by weight, the film will be too fragile to lift from the casting surface and will contain defects, such as holes. The polymer solution can be employed immediately after preparation or stored in appropriate containers, such as teflon bottles, at room temperature.

Although the films are generally prepared from a single polyimide, the polyimide films may be cast from a casting solution containing two or more polyimide polymers which are compatible in film form and which can be dissolved in the casting solution. For example, a casting solution wherein the solvent is butyl acetate and wherein the casting solution contains a polyimide having the general formula

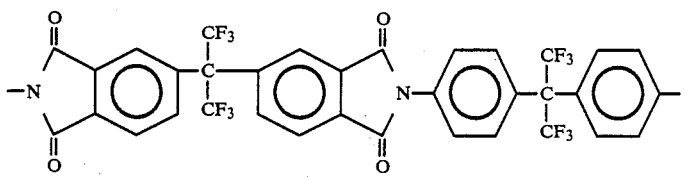

and a polyimide having the general formula

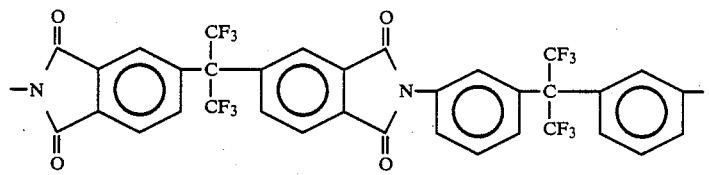

yields excellent, ultrathin, pinhole-free polyimide films. The ratio of the polyimides is not critical when such blended films are prepared.

The polyimide films may also be cast from a mixed polymer solution containing a polyimide polymer and a minor amount of other non-polyimide polymers which are compatible in film form with the polyimide polymer and which can be dissolved in the casting solution. When other polymers are added, the amount of polyimide employed should be about 80 percent or more by weight based upon the total weight of polymers dissolved in the polymeric solution.

Before the polymeric solution is cast into films, it is preferred to filter the solution using membranes. Filtration of the polymer solution before casting substantially reduces imperfections in the cast films. The solution can be passed through a Millipore microfiltration membrane having pores with a diameter of about 0.45 micron and available from the Millipore Corporation. In order to pass the solution through the membrane, it is usually necessary to apply pressure. For example, a Millipore stainless 47 mm pressure holder operated at a pressure up to 100 psi argon can be used. The amount of pressure applied will depend upon the viscosity of the solution and the pore size of the membrane.

After filtration, the solution is cast on water at or near room temperature. As used herein, the term "water" includes aqueous solutions containing minor amounts (e.g. one percent or less by weight based upon the total weight of the solution) of organic solvents (e.g. lower weight alcohols) the presence of which does not adversely affect the properties of the film cast on the solution. The addition of such organic solvents may facilitate the removal of the film from the water's surface. The water is contained in any suitable walled container. For example, an appropriate container is an aluminum container having the dimensions 12"×12"×3". Preferably, the walls of the container are sloped outwardly at about a 20 degree incline to reduce reflected surface waves which can damage the film. Such waves are produced when the polymeric solution is placed on the water's surface or by air currents and external vibrations. Most preferably, the inside walls of the container are teflon coated so that films are less likely to stick to the sides of the container.

The polymeric solution is cast by depositing a drop of the polymer solution upon the water's surface. The solution usually spreads over the surface of the water in three seconds or less. The solution is allowed to stand until a sufficient amount of the solvent has evaporated to form a free-standing film. As used herein the term "free-standing film" refers to a film which has a physically stable shape and is dimensionally stable on its casting surface and can be removed from the casting surface without having to be supported over most (e.g. 30 percent or more) of its surface area. The time of evaporation generally is between 20 and 30 seconds and rarely more than about 60 seconds.

After the solvent has evaporated, the film is lifted from the liquid surface using any suitable means, such as a 2"×3", thin, aluminum plate having a 30 millimeter inner diameter hole in it and a handle on one end of the plate. When the aluminum plate touches the surface of the film, the film adheres to the aluminum plate and may be readily removed from the surface of the water.

The films of the instant invention can be rendered insoluble in their casting solvents and made more durable and chemically resistant by any suitable treatment, such as by radiation, photochemical, chemical, or thermal treatment. Preferably a thermal treatment is employed. For example, the films can be heated at temperatures in the range of about 250° C. to about 350° C., preferably about 290° C., for several hours.

When using a thermal treatment, it is preferred to heat and cool the films very gradually in order to avoid film breakage. For example, the films can be heated from room temperature to the desired temperature at a rate of 2° C. per minute, held at the desired temperature for about two hours, and then gradually allowed to cool to room temperature. Any oven that permits such increments in temperature can be employed.

The films of the instant invention are generally round, ultrathin, pinhole-free, uniform films having a diameter of about four to about six inches and a thickness of about 400 angstroms or less, preferably less than about 300 angstroms and most preferably about 150 to about 300 angstroms. As used herein, the term "ultrathin film" refers to a film having a thickness of 400 angstroms or less, and the term "pinhole-free film" refers to a film having no macroscopic holes.

The films of this invention can be used in end uses where a controlled release of drugs is needed and can be placed on supports and used as gas separation membranes.

The invention is illustrated by the following examples in which all percentages are by weight unless otherwise specified.

EXAMPLE 1

A polymer solution containing 7.4 percent by weight polyimide in a mixture of 20:7 by volume 1,2,3-trichloropropane:ortho-dichlorobenzene was prepared by dissolving the polymer in the solvent mixture. The polyimide was Araldite XU 218, had a density of 1.20 g/cm³, was obtained from the Ciba-Geigy Corporation, Inc., and had repeating units of the formula:

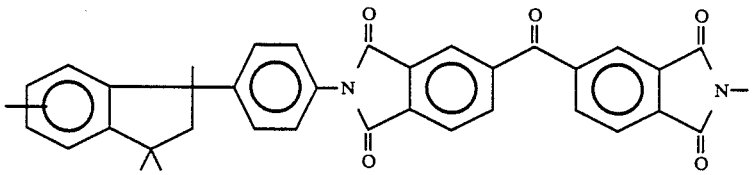

The solution was prepared by magnetically stirring the solvents and the polymer at 60° C. for about five hours.

After the polymer was dissolved in the solvent it was passed through a Durapore polyvinylidene fluoride membrane having pores with a diameter of 0.45 micron obtained from the Millipore Corporation. A Millipore stainless 47 millimeter pressure holder operated at a pressure sufficient to force the solution through the membrane was employed.

After filtration, a drop of the polymer solution was deposited on water contained in a square aluminum container measuring 12"×12"×3" and having teflon coated walls which were sloped away from the center at a 20 degree incline. The drop spread rapidly over the surface of the water to form a film having a diameter of about five inches. After 20 seconds, the film was lifted from the surface of the water using a 2" by 3" aluminum plate with a 30 mm diameter hole in the middle and a handle at one end. The film was uniform, had a thickness of about 230 angstroms and contained no macroscopic voids.

The film was thermally treated by placing the film in a Fisher Isotemp Programmable Ashing Furnace, Model 495, at room temperature and then increasing the temperature at a rate of 2° C. per minute to 290° C. The oven was held at 290° C. for two hours and then the temperature was reduced gradually back to room temperature to cool the film. The resulting film was not soluble in 1,2,3-trichloropropane.

EXAMPLE 2

Example 1 was repeated except that the film was not thermally treated. When a drop of trichloropropane was placed on the film, the film dissolved instantly.

EXAMPLE 3

Example 1 was repeated except that a ten percent by weight solution of the polyimide in 1,2,3-trichloropropane was prepared and the film was not thermally treated. The resulting film contained no macroscopic holes and had a thickness of about 350 angstroms.

EXAMPLE 4

Example 1 was repeated except that an eight percent by weight solution of the polyimide polymer in a 4:1 by volume mixture of 1,2,3-trichloropropane:ortho-dichlorobenzene was prepared. The resulting film had a thickness of about 250 angstroms and contained no macroscopic holes.

EXAMPLE 5

Example 1 was repeated except that a polymer solution containing about 6.0 percent by weight of a fluorinated polyimide in a 3:1 by volume ratio of 1,2,3-trichloropropane:ortho-dichlorobenzene was employed and the film was not thermally treated. The fluorinated polyimide was prepared by reacting 2,2-bis(3,4-dicarboxyphenyl) hexafluoropropane dianhydride and 2,2-bis(4-aminophenyl) hexafluoropropane in accordance with the teachings of application U.S. Pat. No. 07/217,929, which was previously incorporated by reference, and had repeating units of the formula:

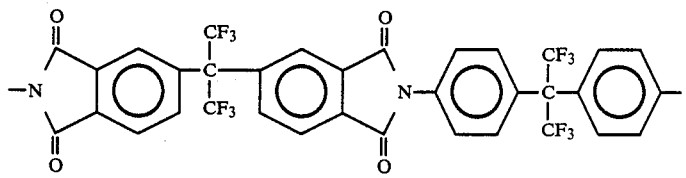

The polyimide had a density of about 1.47 g/cc and a molecular weight, $M_w$, of about 200,000. The resulting film contained no macroscopic holes and had a thickness of about 230 angstroms.

EXAMPLE 6

Example 5 was repeated except that the fluorinated polyimide was prepared by reacting 2,2-bis(3,4-dicarboxyphenyl) hexafluoropropane and 2,2-bis(3-aminophenyl) hexafluoropropane in accordance with the teachings of U.S. patent application Ser. No. 07/217,929, which was previously incorporated by reference, and had repeating units of formula:

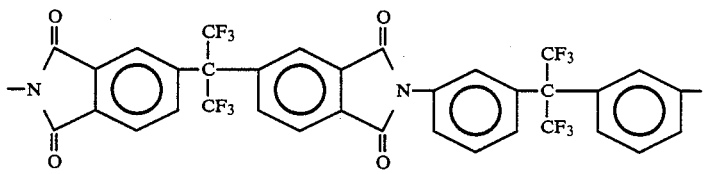

The polyimide had a density of about 1.49 g/cc and a molecular weight, $M_w$, of about 174,000. The resulting film contained no macroscopic holes and had a thickness of less than 400 angstroms.

EXAMPLE 7

Example 5 was repeated except that the polymer solution contained about 6.0 percent by weight of the polyimides used in Examples 5 and 6 in butyl acetate. Equal amounts by weight of the two polyimides were present. The resulting film had a thickness of about 250 angstroms and contained no macroscopic holes.

EXAMPLE 8

Example 7 was repeated except that the polyimide used in Example 6 was present at about the 80 percent by weight level and the polyimide used in Example 5 was present at about the 20 percent by weight level based upon the total weight of polyimides in the casting solution. The resulting film had a thickness of less than about 200 angstroms and contained no macroscopic holes.

As can be seen, thermally treating the films can make them insoluble in their casting solvent and chemically more resistant, and 1,2,3-trichloropropane alone or mixtures of 1,2,3-trichloropropane and ortho-dichlorobenzene may be employed to cast ultrathin, pinhole-free films.

What is claimed is:

1. A process for preparing a pinhole-free, polyimide polymer film having a thickness of about 400 angstroms or less wherein the process comprises:
   (a) preparing a casting solution containing a fluorinated polyimide polymer in 1,2,3-trichloropropane, propyl acetate or butyl acetate;
   (b) depositing the casting solution on water to form a free-standing film; and
   (c) removing the film from the water.

2. The process of claim 1 wherein the polyimide polymer has repeating units of the formula

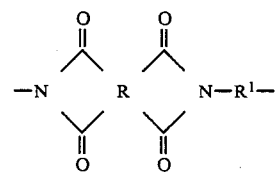

wherein R is

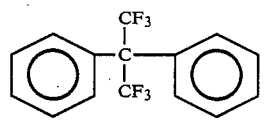

and wherein R' is

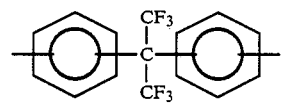

or

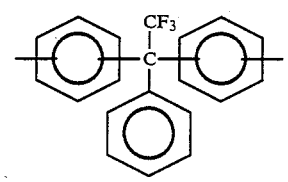

3. The process of claim 2 wherein R' is

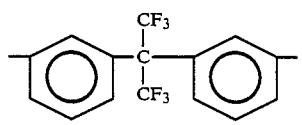

or

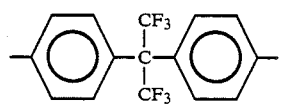

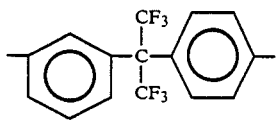

4. The process of claim 1 wherein R' is

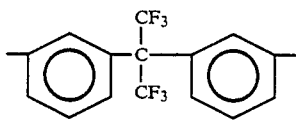

or

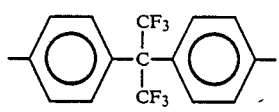

5. The process of claim 1 wherein the film is prepared from polyimide polymers comprising the imidized condensation product of:
   (a) a diamine selected from the group consisting of 2,2-bis (3-aminophenyl) hexafluoropropane and 2,2-bis(4-aminophenyl) hexafluoropropane; and
   (b) a mixture of dianhydrides comprising:
      (i) pyromellitic dianhydride; and
      (ii) at least one additional dianhydride having a diaryl nucleus.

6. The process of claim 5 wherein the relative proportions of the dianhydrides present in the mixture are from about 35 to about 75 mole percent of (i) and from about 25 to about 65 mole percent of (ii).

7. A process for preparing a pinhole-free, polyimide polymer film having a thickness of about 400 angstroms or less wherein the process comprises:
   (a) preparing a casting solution containing a fluorinated polyimide polymer having the repeating formula

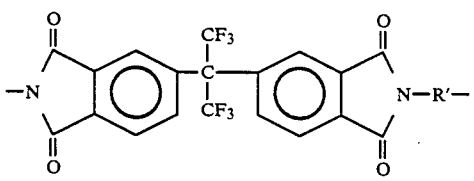

wherein R' is

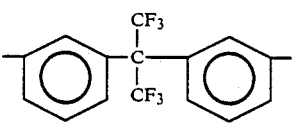

or

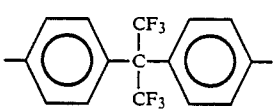

at about the two to about the twelve percent by weight level, based upon the total weight of the casting solution, in 1,2,3-trichloropropane, propyl acetate or butyl acetate;
   (b) depositing the casting solution on water to form a free-standing film; and
   (c) removing the film from the water.

8. A process for preparing a pinhole-free, polyimide polymer film having a thickness of 400 angstroms or less wherein the process comprises:
   (a) preparing a casting solution containing a polyimide polymer comprising the imidized condensation product of:
      (1) a diamine selected from the group consisting of 2,2-bis(3-aminophenyl) hexafluoropropane and 2,2-bis (4-aminophenyl) hexafluoropropane; and
      (2) a mixture of dianhydrides comprising;
         (i) pyromellitic dianhydride; and
         (ii) at least one additional dianhydride having a diaryl nucleus,
   wherein the polyimide is present at about the two to about the twelve percent by weight level, based upon the total weight of the casting solution, in 1,2,3-trichloropropane, propyl acetate or butyl acetate;
   (b) depositing the casting solution on water to form a free-standing film; and
   (c) removing the film from the water.

9. The process of claim 8 wherein the relative proportions of the dianhydrides present in the mixture are from about 35 to about 75 mole percent of (i) and from about 25 to about 65 mole percent of (ii).

10. The process of claims 1-5, 7 or 8 wherein 1,2,3-trichloropropane or butyl acetate is employed.

11. The process of claims 5 or 8 wherein the additional dianhydride is selected from the group consisting of bis (3,4-dicarboxyphenyl) ether dianhydride, 3,3', 4,4'-benzophenone tetracarboxylic dianhydride, 3,3', 4,4'-diphenyl tetracarboxylic acid dianhydride and 2,2-bis(3,4-dicarboxyphenyl) hexafluoropropane dianhydride.

12. The process of claims 5 or 8 wherein the mixture of dianhydrides is present at a ratio of about 50 mole percent of each.

13. The process of claims 5 or 8 wherein the diamine is 2,2-bis(4-aminophenyl) hexafluoropropane.

14. The process of claim 13 wherein the additional dianhydride is 2,2-bis(3,4-dicarboxyphenyl) hexafluoropropane dianhydride.

15. The process of claim 14 wherein the mixture of dianhydrides is present at a ratio of about 50 mole percent of each.

16. The process of claims 1-5, 7 or 8 wherein 1,2,3-trichloropropane is employed.

17. The process of claim 16 wherein the casting solution contains ortho-dichlorobenzene in addition to 2,3-trichloropropane.

18. The process of claim 17 wherein 1,2,3-trichloropropane and ortho-dichlorobenzene are present in the casting solution at about, a 1:1 to about a 10:1 by volume ratio, respectively.

19. The process of claim 18 wherein the ratio is about 20:7.

20. The process of claims 1-5, 7 or 8 wherein the polyimide polymer has a molecular weight, $M_w$, greater than about 25,000.

21. The process of claims 1-5, 7 or 8 wherein the polyimide polymer has a molecular weight, $M_w$, of at least about 75,000.

22. The process of claims 1, 2, 3, 4 or 5 wherein the polyimide polymer is present at about the two to about the twelve percent by weight level in the casting solution based upon the total; weight of the casting solution.

23. The process of claims 1-5, 7 or 8 wherein the polyimide polymer is present at about the four to about the ten percent by weight level in the casting solution based upon the total weight of the casting solution.

24. The process of claim 23 wherein the polymer is present at about the six to about the eight percent by weight level.

25. The process of claims 1-5, 7 or 8 wherein the film is rendered, insoluble in its casting solvent.

26. The process of claim 25 wherein the film is rendered insoluble in its casting solvent by thermal treatment.

27. The process of claims 1-5, 7 or 8 wherein the casting solution contains a polyimide polymer at about the 80 to about the 100 percent by weight level and another non-polyimide polymer or polymers at about the 20 to about the 0 percent by weight level based upon the total weight of the polymers dissolved in the casting solution.

28. The process of claim 1 wherein the film is prepared from a casting solution comprised of a polyimide having the general formula

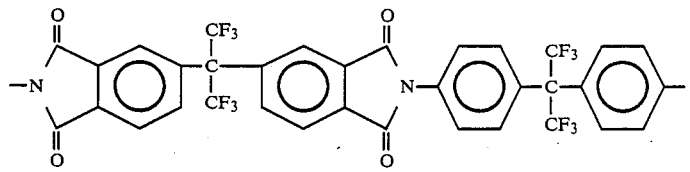

and a polyimide having the general formula

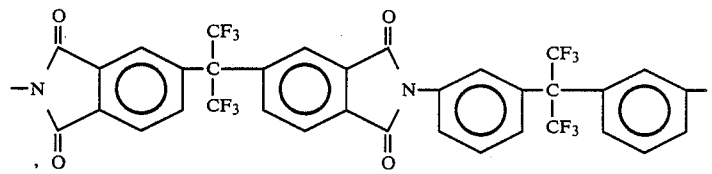

29. The process of claim 28 wherein butyl acetate is employed.

UNITED STATES PATENT AND TRADEMARK OFFICE
CERTIFICATE OF CORRECTION

PATENT NO. : 4,929,405

DATED : May 29, 1990

INVENTOR(S) : Rachel S. Kohn

It is certified that error appears in the above-identified patent and that said Letters Patent is hereby corrected as shown below:

On the title page, item (54) and in column 1;

In the title, change "Flims" to --Films--.

Signed and Sealed this

Fourteenth Day of January, 1992

*Attest:*

HARRY F. MANBECK, JR.

*Attesting Officer*  *Commissioner of Patents and Trademarks*